US010234560B2

(12) United States Patent
Van Der Tempel et al.

(10) Patent No.: US 10,234,560 B2
(45) Date of Patent: Mar. 19, 2019

(54) METHOD AND TIME-OF-FLIGHT CAMERA FOR PROVIDING DISTANCE INFORMATION

(71) Applicant: SoftKinetic Sensors NV, Brussels (BE)

(72) Inventors: Ward Van Der Tempel, Muizen (BE); Riemer Grootjans, Antwerp (BE)

(73) Assignee: Sony Depthsensing Solutions SA/NV, Brussels (BE)

(*) Notice: Subject to any disclaimer, the term of this patent is extended or adjusted under 35 U.S.C. 154(b) by 0 days.

(21) Appl. No.: 15/884,815

(22) Filed: Jan. 31, 2018

(65) Prior Publication Data

US 2018/0164438 A1    Jun. 14, 2018

Related U.S. Application Data

(60) Continuation of application No. 15/425,361, filed on Feb. 6, 2017, now Pat. No. 9,921,311, which is a
(Continued)

(30) Foreign Application Priority Data

Jul. 15, 2011 (GB) .................................. 1112256.1

(51) Int. Cl.
*G01C 3/08* (2006.01)
*G01S 17/10* (2006.01)
(Continued)

(52) U.S. Cl.
CPC .............. *G01S 17/10* (2013.01); *G01S 7/484* (2013.01); *G01S 7/487* (2013.01); *G01S 7/4865* (2013.01); *G05D 13/08* (2013.01)

(58) Field of Classification Search
CPC .......... G01S 17/10; G01S 7/484; G05D 13/08
See application file for complete search history.

(56) References Cited

U.S. PATENT DOCUMENTS 7,184,1130    2/2007  Barr
7,742,556 B1  6/2010  Qian
(Continued)

FOREIGN PATENT DOCUMENTS

WO    WO 2009-079789 A1    7/2009

OTHER PUBLICATIONS

International Search Report and Written Opinion for International Application No. PCT/EP2012/063696 dated Oct. 24, 2012.
(Continued)

*Primary Examiner* — Samantha K Abraham
(74) *Attorney, Agent, or Firm* — Wolf, Greenfield & Sacks, P.C.

(57) ABSTRACT

The invention relates to a method for providing distance information of a scene with a time-of-flight camera, comprising the steps of emitting a modulated light pulse towards the scene, receiving reflections of the modulated light pulse from the scene, evaluating a time-of-flight information for the received reflections of the modulated light pulse, and deriving distance information from the time-of-flight information for the received reflections, whereby a spread spectrum signal is applied to a base frequency of the modulation of the light pulse, and the time-of-flight information is evaluated under consideration of the a spread spectrum signal applied to the base frequency of the modulation of the light pulse. The invention further relates to a time-of-flight camera for providing distance information from a scene, whereby the time-of-flight camera performs the above method.

12 Claims, 6 Drawing Sheets

Related U.S. Application Data division of application No. 14/232,518, filed as application No. PCT/EP2012/063696 on Jul. 12, 2012, now Pat. No. 9,599,712.

(51) Int. Cl.
  *G05D 13/08* (2006.01)
  *G01S 7/484* (2006.01)
  *G01S 7/486* (2006.01)
  *G01S 7/487* (2006.01)

(56) References Cited

U.S. PATENT DOCUMENTS

| | | |
|---|---|---|
| 9,599,712 B2 | 3/2017 | Van Der Tempel et al. |
| 2007/0120989 A1 | 5/2007 | Minami et al. |
| 2010/0141824 A1 | 6/2010 | Carlson et al. |
| 2010/0277713 A1 | 11/2010 | Mimeault |
| 2014/0160461 A1 | 6/2014 | Van Der Tempel et al. |
| 2017/0212236 A1 | 7/2017 | Van Der Tempel et al. |

OTHER PUBLICATIONS

International Preliminary Report on Patentability for International Application No. PCT/EP2012/063696 dated Jan. 30, 201.

Mart Coenen et al.,: "Discrete spread-spectrum sampling (DSSS) to reduce RF emission and beat frequency issues", Electromagnetic Compatibility (APEMC), 2010 Asia-Pacific Symposium on, IEEE, Piscataway, NJ. USA (Apr. 12, 2010), XP031682824, ISBN: 978-1-4244-5621-5.

METHOD AND TIME-OF-FLIGHT CAMERA FOR PROVIDING DISTANCE INFORMATION

CROSS REFERENCE TO RELATED APPLICATIONS

This application is a continuation of and claims the benefit under 35 U.S.C. § 120 of U.S. patent application Ser. No. 15/425,361, titled "METHOD AND TIME-OF-FLIGHT CAMERA FOR PROVIDING DISTANCE INFORMATION," filed on Feb. 6, 2017, which is a division of U.S. patent application Ser. No. 14/232,518, titled "METHOD AND TIME-OF-FLIGHT CAMERA FOR PROVIDING DISTANCE INFORMATION," filed on Jan. 13, 2014, which is a U.S. National Stage Application under 35 U.S.C. § 371, based on International Application No. PCT/EP2012/063696, filed Jul. 12, 2012, which claims priority to British Patent Application No. GB1112256.1, filed Jul. 15, 2011, each of which is hereby incorporated by reference in its entirety.

The present invention relates to a method for providing distance information of a scene with a range finding device such as a time-of-flight sensor or time-of-flight camera, comprising the steps of emitting a modulated light pulse towards the scene, receiving reflections of the modulated light pulse from the scene, evaluating a time-of-flight information for the received reflections of the modulated light pulse, and deriving distance information from the time-of-flight information for the received reflections. The present invention also relates to a range finding device such as a time-of-flight sensor or time-of-flight camera for providing distance information from a scene according to the above method.

BACKGROUND

A time-of-flight camera, also referred to as TOF camera, is a camera that usually comprises a light source or emitter unit for emitting modulated light pulses, a receiver unit that captures reflections of the light pulses, an evaluation unit, which evaluates time-of-flight information or the received reflections, and a calculation unit, which derives distance information from the time-of-flight information. The distance information is also referred to as depth. The emitter unit emits a modulated light pulse towards a scene, whereby the modulated light pulse is reflected from objects present in the scene towards the receiver unit. Depending on the distance of the objects from the TOF camera, the reflections are received with a delay in respect to the emitted modulated light pulse. This delay, also referred to as time-of-flight, is evaluated by the evaluation unit and further processed by the calculation unit to derive a distance of the objects.

The receiver unit comprises several light receiving points, also referred to as pixel, and an optical system, so that different pixels can receive reflections from different objects at the same time. Each of the pixels independently receives reflections of the modulated light pulses. Also the time-of-flight information and distance information are processed individually for each pixel, so that the distance information is provided for the entire scene simultaneously The distance is measured pixel per pixel in an indirect manner by measuring the time delay or phase difference between sent and received modulated optical signal. Typically, the modulation can be a pulsed modulation, sinusoidal modulation, pseudo-noise modulation, etc. The phase difference of the sent and received modulation signal then offers a measure for the time delay.

Figure 1:
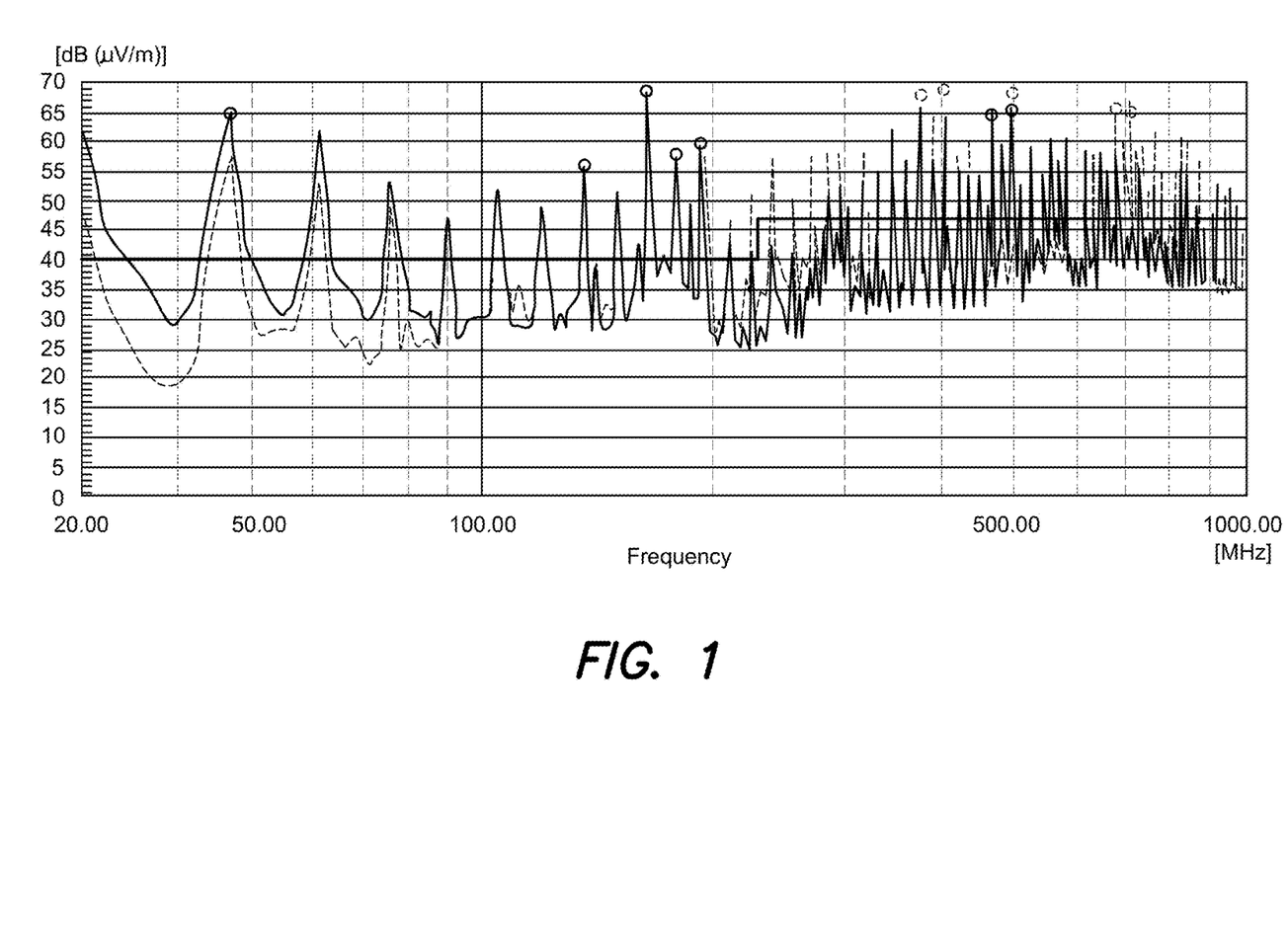
FIG. 1 shows an EMC measurement of a time-of-flight camera.

To provide a TOF camera that can provide distance information with high accuracy, sharply defined pulses are used, which have preferably a limited rise and fall time. Due to this requirement the spectral content of the electronic modulation signal used to modulate the light output of electronic light sources contains a lot of harmonics with significant energy, as shown in the example spectrum of FIG. 1.

Also, the modulation frequency is usually well defined since the transformation from phase measurement to distance measurement requires accurate knowledge of the modulation frequency. Due to this, the peaks in the spectrum tend to be narrow but high.

Problems can arise, since TOF cameras must co-exist with other electronic devices. A lot of energy in the harmonics can prevent electromagnetic compliance of the device. Normally such a device has to comply with different norms. Relevant norms for electromagnetic compliance (EMC) are available according to the FCC (USA), EC (Europe) or CCC (China) standards. Accordingly, the use of TOF cameras can be restricted and/or the accuracy of TOF cameras can be limited indirectly by the requirement to fulfill EMC requirements. Typical modulation frequencies are between 10 MHz and 100 MHz, generating related harmonics.

Reducing the amount of EMI radiated from an electronic device is one of the hardest problems to resolve in the drive for lower production costs. Producing a compliant device can be quite costly if the necessary steps are not taken at design time. It is possible that 40-50% of the development cost of a new product can be spent in the quest for a compliant product suitable for economic production.

A clock oscillator generates a fixed frequency square wave signal used for timing in high-speed digital systems. The frequency of this clock is assumed to be fixed and taking the inverse of frequency gives the period of the clock. The period of the clock is the time from a point on the rising edge to the exact same point on the rising edge of the very next clock. An ideal clock would have no measurable jitter and the period of each clock cycle would always be exactly the same. A Low EMI clock oscillator or Spread Spectrum Clock is a special type of digital clock that provides lower EMI when compared with conventional clock generator outputs. The base frequency is modulated and the energy is spread out over a wider spectrum of frequencies, thereby reducing the peak energy contained at any one frequency. The peaks of the fundamental and harmonic frequencies are lower in relative strength. The total amount of energy that was originally in the harmonics of the base frequency clock signal does not simply disappear but rather is distributed over a wider band of frequencies. By varying the frequency of a clock, the period of such a clock is also changed which is the same as providing jitter. Thus cycle-to-cycle jitter is added to such a clock. Jitter will reduce the precision of range finding time-of flight devices in determining distance.

SUMMARY OF THE INVENTION

It is therefore an object of the present invention to provide an alternative method for providing distance information of a scene with a range finding device such as a time-of-flight sensor or a time-of-flight camera, as well as an alternative range finding device such as a time-of-flight sensor or time-of-flight camera adapted to provide distance information from a scene according to the above method.

This object is achieved by the independent claims. Advantageous embodiments are detailed in the dependent claims. An advantage of embodiments of a method and of a range finding device such as a time-of-flight sensor or a time-of-flight camera is that the distance information is obtained with high accuracy while reducing EMI. Hence an advantage of embodiments of a method and of a range finding device such as a time-of-flight sensor or a time-of-flight camera according to the present invention is that compliance with EMC standards while maintaining high accuracy.

Accordingly, the above object is achieved by a method for providing distance information of a scene with a range finding device such as a time-of-flight sensor or a time-of-flight camera, comprising the steps of emitting an periodic light signal such as a train of light pulses towards the scene, receiving reflections of the periodic light signal from the scene, evaluating a time-of-flight information for the received reflections of the periodic light signal and deriving distance information from the time-of-flight information for the received reflections, whereby the periodic light signal is emitted in accordance with a modulation signal at a base frequency whereby a perturbation is applied to a base frequency of the modulation signal as a frequency modulation. This frequency perturbed modulation signal is then used to generate the periodic light signal and is also used as a reference signal by the detector receiving the reflected light for determining the time-of-flight information. This can be done on a pixel-by-pixel basis. From this distance information as well as an image of the scene, a 3D image can be generated.

Accordingly in one aspect the present invention a method for providing distance information of a scene is provided comprising the steps of:
    emitting a periodic light signal towards the scene in accordance with a clock timing that has a base frequency spread by a periodic perturbation with a perturbation frequency and period,
    receiving reflections of the periodic light signal from the scene,
    evaluating a time-of-flight information for the received reflections of the periodic light signal over a set of a plurality of measurement durations in accordance with the clock timing that is spread by a periodic perturbation as a reference signal, and
    deriving distance information from the time-of-flight information for the received reflections, wherein each measurement duration of the set is an integer or half integer multiple of the perturbation period and over the set of measurement durations the average base frequency is kept constant.

The periodic light signal can be pulses, such as square wave pulses but also other waveforms such as sinusoidal signals.

The object is also achieved by range finding device such as a time-of-flight sensor or a time-of-flight camera for providing distance information from a scene, whereby the time-of-flight camera performs the above method.

Accordingly in another aspect of the present invention a time-of-flight sensor for use with a light source for emitting a periodic light signal towards a scene is provided, the sensor being for providing distance information from the scene, the sensor comprising:
a modulation unit for providing a modulation signal to the light source based on a clock timing with a base frequency spread by a periodic perturbation having a perturbation frequency and period,
a reception group with a receiver unit, an evaluation unit and a processing unit, the reception group being connected to the modulation unit to receive the modulation signal,
the evaluation unit being adapted to evaluate time-of-flight information from received reflections from the scene over a set of a plurality of measurement durations in accordance with the clock timing that is spread by the periodic perturbation as a reference signal,
the calculation unit being adapted to derive distance information from the time-of-flight information provided by the evaluation unit wherein each measurement duration of the set is an integer or half integer multiple of the perturbation period and over the set of measurement durations the average base frequency is kept constant.

The modulation signal can be pulses, such as square wave pulses but also other waveforms such as sinusoidal signals.

The present invention also provides a timing module for time-of-flight sensor for use with a light source for emitting a periodic light signal towards a scene, the sensor being for providing distance information from a scene, the timing module comprising:
a modulation unit (3) for providing a modulation signal for the light source based on a clock timing with a base frequency spread by a periodic perturbation with a perturbation frequency and period,
the modulation being adapted to provide the modulation signal over a set of a plurality of measurement durations in accordance with the clock timing that is spread by the periodic perturbation,
wherein each measurement duration of the set is an integer or half integer multiple of the perturbation period and over the set of measurement durations the average base frequency is kept constant.

The modulation signal applied to the light sources can be pulses, such as square wave pulses but also other waveforms such as sinusoidal signals.

One aspect of the present invention is to apply a periodic frequency perturbation to the base frequency of the modulation of the light and to evaluate the time-of-flight information for reflections under consideration of this perturbation whereby each measurement duration of a set of measurement durations needed to determine one phase difference value is an integer or half integer multiple of the perturbation period. In addition the average base frequency is kept constant over each measurement duration of the total measurement durations needed to determine one phase difference value despite the perturbation. The periodic perturbation excludes random perturbations of frequency which would not have the same spectral content even if they would provide the same average frequency. The perturbation can be a continuous oscillating variation in base frequency or a sequence of different frequencies centered around the base frequency.

Despite the perturbation of the base frequency of the periodic light signal introducing some effective jitter, the evaluation of the time-of-flight information for reflections can be done with high accuracy. Objects, which are present in the scene, can be reliably detected and suitable distance information can be provided for these objects. The applied frequency perturbation improves the electromagnetic compliance of the range finding device such as a TOF sensor or the TOF camera. It has the effect that some high-energy fundamental or harmonic peaks are no longer located at sharply defined frequencies in the spectrum. The energy in the peaks is spread over a larger spectral region, lowering the spectral energy density and thus improving the EMC. This technique results not only in a "spread spectrum" technique applied to the periodic light signal but also maintains the spectral content constant over the set of measurement durations needed to determine one phase difference value. Spread spectrum clocks with periodic clock timing perturbations, are readily available but these introduce some jitter. They can be incorporated into TOF sensors or TOF cameras with the novel modifications of embodiments of the present invention.

The time-of-flight information of the received reflections is determined by measuring the time delay or phase change between the received periodic light signal and the reference signal, both having experienced the same perturbation. Due to this homodyne measurement principle, the perturbation potentially does not affect the time-of-flight measurement. The received reflections, which are correlated or mixed due to the overlap of the emitted and the received pulses, can be easily evaluated in respect to the time-of-flight information and the distance information can easily be derived from this time-of-flight information. In one embodiment a TOF sensor or a TOF camera, preferably a spread spectrum clock or a single system clock together with a single perturbation clock, is used for generating the modulation signal for generation of the periodic light signal and also in the evaluation of the time-of-flight information. The perturbation is a periodic signal, e.g. it is a signal with a low frequency compared to the base frequency of the modulation.

According to a preferred embodiment of the invention applying the perturbation to the base frequency of the modulation comprises modifying the base frequency of the modulation within an interval of +/−5% of the base frequency of the modulation, preferably within an interval +/−1.5% of the base frequency of the modulation, even more preferably within an interval +/−0.1% of the base frequency of the modulation. The size of the interval influences how strongly the energy in the harmonics is spread in the spectrum and accordingly influences the energy density of the spikes in the frequency spectrum. The bigger the interval, the lower the energy density of the harmonics. This results in the TOF sensor or the TOF camera being able to be complaint with EMC regulations more easily.

In a preferred embodiment of the present invention the time-of-flight information of a scene is measured in a sequence of acquisitions. The combination of these different acquisitions allows removal of ambient light influence and removal of object reflectivity and other sources disturbing the time-of-flight measurement. The result of the acquisitions is a determination of the time delay or phase change between the emitted and received light. The steps for such acquisition includes: emitting a periodic light signal towards the scene and receiving reflections of the periodic light signal from the scene performed sequentially in the given order at least twice, and the step of evaluating a time-of-flight information for the received reflections of the periodic light signal which comprises integrating the received reflections of the periodic light signal over all performances of the step of receiving reflections of the periodic light signal from the scene. By integrating the received reflections over a duration of the reflected periodic light signal, the time-of-flight can be evaluated more accurately. Reflections from objects far away can be easily detected, even though the reflection of the periodic light signal from the object has only a low intensity. Hence, a "deep" scene with distant objects as well as objects close by can be covered. Also, the integral evaluation results in an averaging of the received reflections over a duration which avoids isolated errors. Preferably, the integration is performed over the reflections of at least three performances of the steps of emitting the periodic light signal and receiving the reflections from the scene. Problems can occur when the spectral content of the periodic light signal changes over the period of measurement for one time of flight distance determination. For this reason methods and apparatus of the present invention are adapted to keep the spectral content the same over the complete measurement period required for the acquisition of one distance determination.

Firstly, according to a preferred embodiment of the present invention all acquisitions required for a time-of-flight measurement are obtained using the same average frequency. The average frequency preferably is the frequency, around which the base frequency is changed due to the applied perturbation. This requires a balanced or center spread perturbation. The essentially identical average base frequency allows an accurate processing of the received reflections of the emitted periodic light signal into valid depth information.

In a preferred embodiment of the present invention each acquisition required for a time-of-flight measurement experiences the same periodic light signal, including the same perturbation of the base frequency signal. The result is the same spectral content for each acquisition. The perturbation can be a known and repeated sequence of change of the base frequency, and this known perturbation sequence is applied to the base frequency in the same way for all acquisitions in the ToF measurement. Accordingly, as the frequency perturbation is periodic and the measurement duration is an integer or half integer number of perturbation periods, the emission of the periodic light signal is started always at the same position in the perturbation signal within the perturbation period or with a half period offset. As half period plus an integer number of periods is the same as the integer number of periods plus a half a period, this also provides the same spectral content as a pure integer number.

There is no need for synchronisation between the period of the base frequency and the perturbation period when the difference in frequency between the base and perturbation frequencies is high as the error induced is very small. Thus the same "spectral content" is not synonymous with "exactly identical spectral content". Any difference is preferably smaller than the noise floor of the system. For example, differences of the order of less than 0.1% or 0.01% can be tolerated. Synchronisation between the base period and the perturbation period is not excluded from the present invention when it is required for additional accuracy.

Preferably, a continuous perturbation signal can be used. According to another embodiment of the invention the perturbation is a discontinuous modulation applied to the base frequency of the periodic light signal. It is merely required, that the perturbation modulation is a periodically repeated signal and that the average frequency of the resulting perturbed signal is known. It is preferred that the average frequency is the center frequency.

BRIEF DESCRIPTION OF THE DRAWINGS

Preferred embodiments of the invention are illustrated in the accompanied figures. These embodiments are merely exemplary, i.e. they are not intended to limit the content and scope of the appended claims.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where an indefinite or definite article is used when referring to a singular noun e.g. "a" or "an", "the", this includes a plural of that noun unless something else is specifically stated. In the different figures, the same reference signs refer to the same or analogous elements. The illustrations in the figures are schematic.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The present invention will be described with reference to a TOF camera but the present invention also includes the provision of any kind of range finding device working on the Time of Flight principle, a TOF sensor, e.g. with only one pixel, etc. Further the TOF camera or the TOF sensor is not necessarily delivered with an integral light source. The light source and its energy supply and drivers can be provided separately and the camera or sensor only needs to comprise circuitry to provide signals for modulating the light source.

Figure 5:
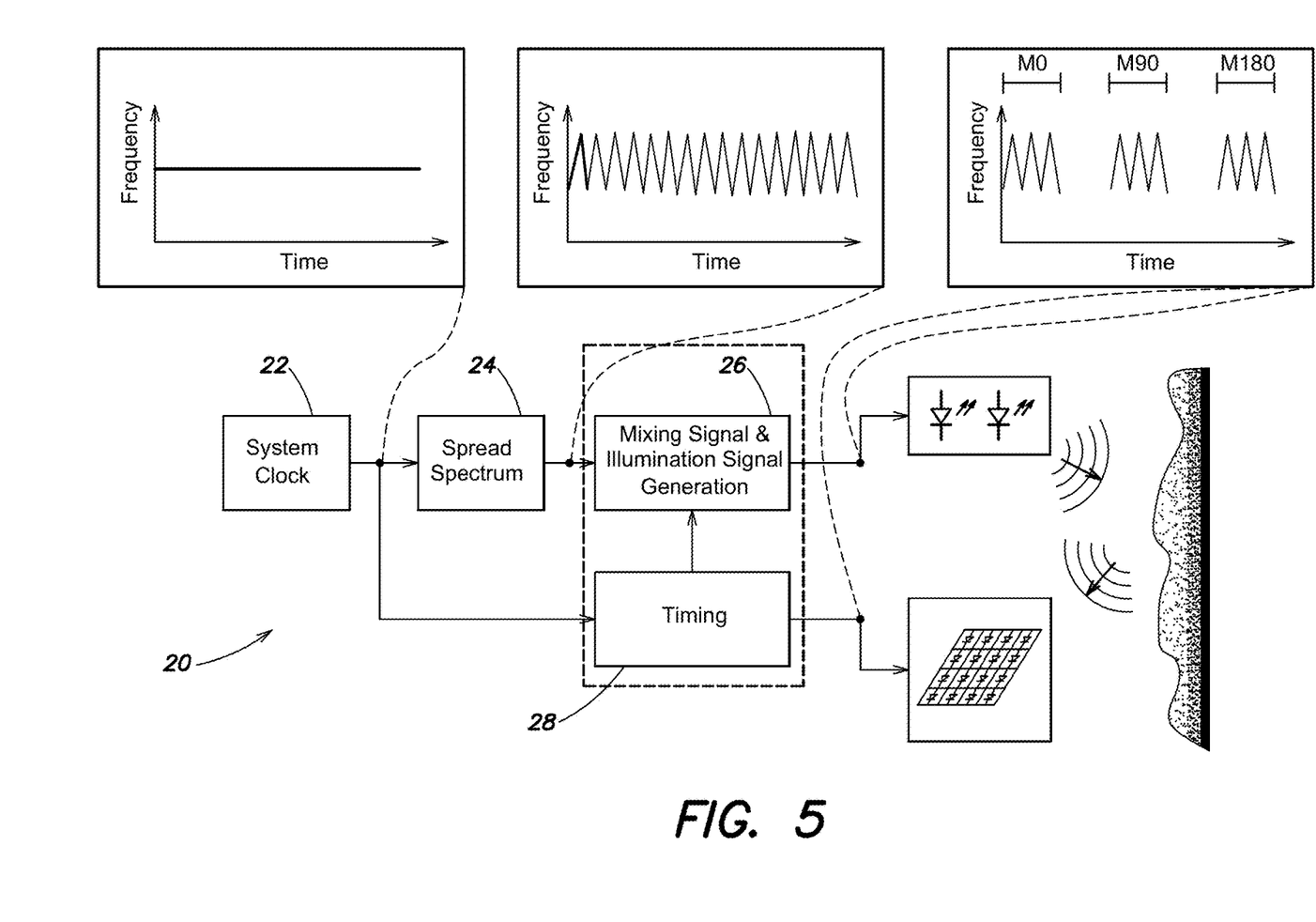
FIG. 5 shows a schematic diagram of a timing module for a time-of-flight camera according to an embodiment of the present invention.

An embodiment of the present invention will be described with reference to FIG. 5 which is a schematic block diagram of a timing module 20 that can be used with a TOF camera. This embodiment has a clean system clock 22, running at, for example, 80 MHz, e.g. in the range 10 to 320 MHz, and will be called the 'clean clock'. The clock signal of the clean clock 22 is sent to a Spread Spectrum block 24, which spreads the spectrum of this clock signal using a periodic spreading function, called the 'perturbation frequency modulating signal'. Optionally, other components can be placed between the clean clock 22 and the spread spectrum block 24, such as filters, wave shapers, frequency converters, phase locked loops, etc. The output of this Spread Spectrum block is called the 'spread clock signal'. Optionally, other components can be placed after the spread spectrum block, such as filters and wave shapers, e.g. to generate a modulation signal with a desired waveform such as sinusoidal.

The perturbation frequency is within +/−5% of the base frequency of the modulation, preferably within an interval +/−5 or +/−1.5% of the base frequency of the modulation, or within an interval +/−0.1% of the base frequency of the modulation. The periodic perturbation can have a sinusoidal or triangular waveform or saw tooth form for example.

The timing module 20 can be adapted to supply a discontinuous modulation to the light sources.

The spread clock signal is used by the Mixing signal and illumination generation block 26, which generates the required TOF light source drive signals at a typically, perhaps 2 or 4 times lower frequencies. These TOF signals include the signal used to modulate the light source, called the 'light modulating signal', as well as the mixing signals required by the sensor in order to be able to de-modulate the incoming light, reflected by the scene. Thus the same TOF timing signals are sent to both an illumination unit comprising light sources as well as the detector used for detecting received reflected light. Optionally, other components can be placed after the Mixing signal and illumination generation block 26, such as filters and wave shapers, e.g. to generate a modulation signal with a desired waveform such as sinusoidal.

In order for the Time-of-Flight principle to remain valid, these TOF signals can be frequency modulated, but their average frequency must be known. Further, because each single TOF distance measurement is composed out of multiple integrations derived from multiple acquisition periods, this mean frequency must be the same during these multiple integrations. This becomes an important requirement in case the multiple integrations are taken consecutively in time. In such case, if the mean frequency is not kept the same during the multiple measurements, the resulting calculated distance will be wrong or the calculation therefor will be made very difficult or inaccurate.

A Timing block 28 is responsible for making sure the average frequency remains the same during the multiple integrations. In one aspect of the present invention this is achieved by making sure that the integration time is exactly an integer number of periods of the perturbation frequency modulating signal. In the event where the perturbation frequency modulating signal is a symmetrical signal (such as a sine or triangle wave), the integration time can also be taken as a integer multiple of half the period time of the perturbation frequency modulating signal. The timing block 28 preferably receives the clean clock signal from the system clock 22 which is used by the timing block 28 to determine that each integration time is the same number of pulses applied to the light sources and hence that the average frequency is constant.

Furthermore the periodic signal applied to the light sources taken over one integration time or measurement duration of a set of integration times or measurement durations has the same spectral content as the periodic signal taken over any other measurement duration of the set.

Furthermore, background light present in the scene (e.g. sunlight, ambient light) can reduce or destroy the validity of the obtained depth measurement, so special care is preferably taken that the exact same amount of background light is received by the sensor during each of the consecutive integrations. Therefore, the TOF signals used during the consecutive integrations must have the same spectral content, and they must preferably be aligned with the background light.

Both requirements can be fulfilled by the Timing block 28, which uses the clean clock signal to make sure the average frequency during each integration phase remains the same, and to make sure that the integration phases are perfectly aligned with the ambient light. For example, typically 50 Hz or 60 Hz mains frequencies are used, so that background light from lamps will have frequency components relating to these two common frequencies. 50 Hz background lighting has a different optimal timing setting compared to a 60 Hz background lighting.

Application of a Spread Spectrum has a positive impact on the EMI performance of the overall system, while it has a small negative impact on system noise performance (jitter). Advantageously, the architecture described above can be extended if the mixing block 26 is adapted to allow dynamical increasing or decreasing of the perturbation frequency, effectively increasing or decreasing the Spread Spectrum impact. Such a feature is useful for factory or on-site calibration. As employed in embodiments o the present invention Spread Spectrum impact is minimal while still performing within EMI limits.

In accordance with a further embodiment the perturbation modulation can be set in accordance with the power supplied to the light sources. In a low-power mode, which causes less EM radiation, a lower frequency modulating algorithm can be used by the mixing block 28, in order to provide an optimal tradeoff for this mode.

Figure 4:
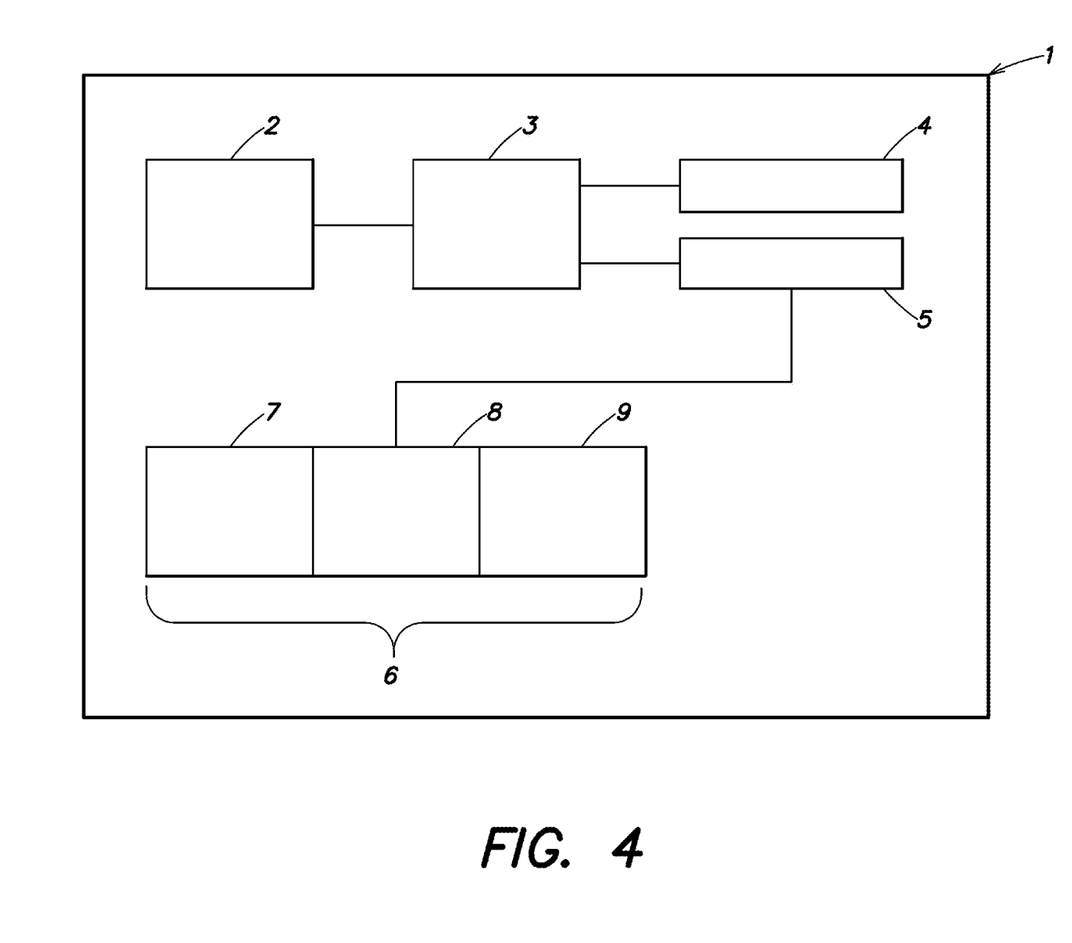
FIG. 4 shows a schematic diagram of a time-of-flight camera according to an embodiment of the present invention.

Referring now to FIG. 4, a time-of-flight camera 1, also referred to as TOF camera 1, according to one embodiment of the present invention can be seen. The time-of-flight camera 1 comprises a an illumination unit with at least one light source 2, which is in this embodiment of the invention a LED, for emitting a periodic signal light signal such as modulated light pulses having a wave length and frequency depending on characteristics of the light sources towards a scene. Other light sources can be used such as OLED's, laser diodes, lasers etc.

The light source 2 is connected to a modulation unit 3, which provides a perturbed modulation signal to the light source for modulation thereof. The modulation unit 3 can be provided as on-chip implementation for achieving reliable control of the perturbed modulation signal.

The time-of-flight camera further comprises a modulation clock or "clean lock" 4 and a perturbation clock 5, which are both connected to the modulation unit 3. The modulation clock 4 provides a clock signal, as can be seen in the upper time scale of FIG. 2, as base frequency for the frequency modulation to the modulation unit 3 and the perturbation clock 5 provides a further clock signal as perturbation signal to the modulation unit 3. The perturbation clock 5 provides the perturbation signal with a perturbation frequency, which is lower than the base frequency for the frequency modulation.

Other components can be placed between the clocks 4, 5 and the modulation unit 3, such as filters, wave shapers, frequency converters, phase locked loops, etc. Other components can be placed after the modulation unit 3, such as filters, or wave shapers to generate a periodic signal such as square wave or sinusoidal.

Figure 2:
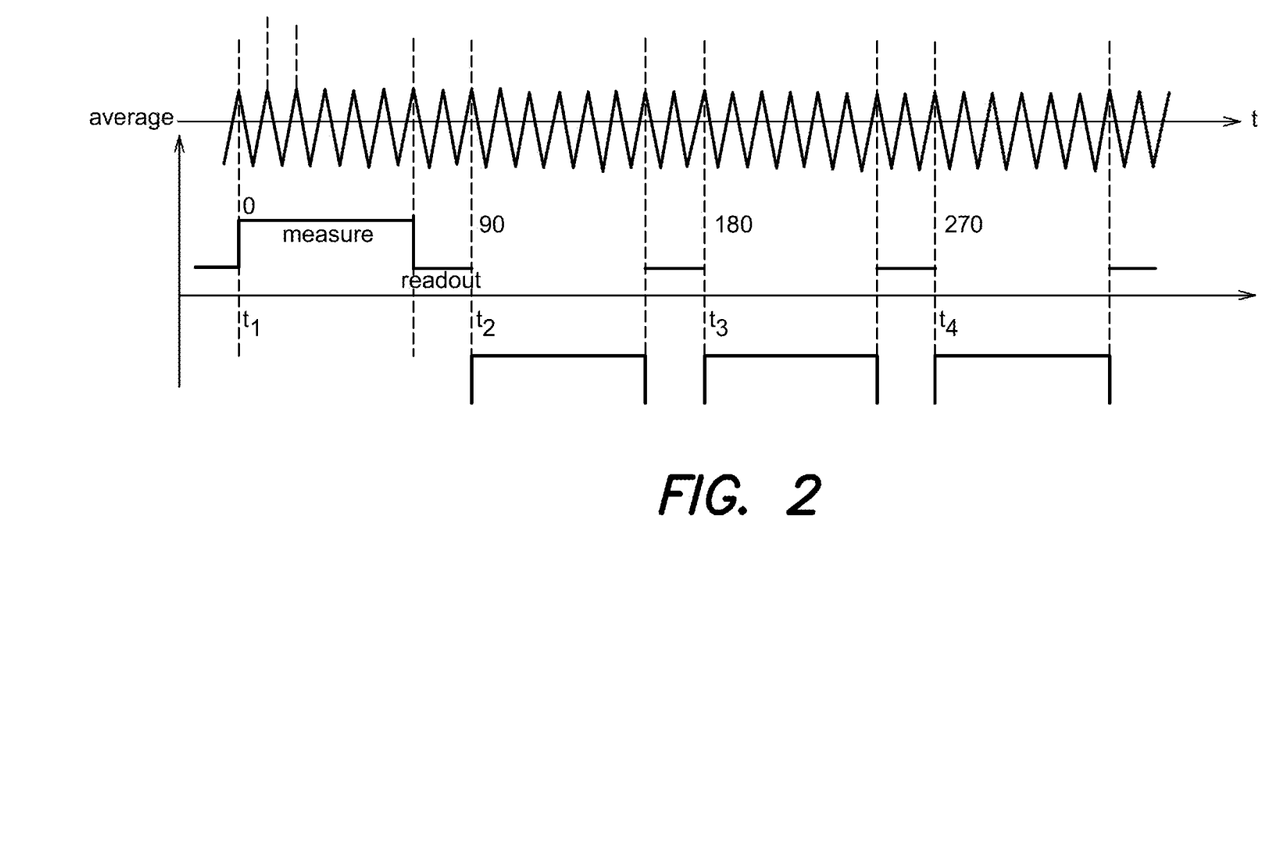
FIG. 2 shows a time diagram of a modulation signal and a lower frequency perturbation signal according to an embodiment of the present invention.

The perturbation applied to the base frequency of the modulation in the modulation unit 3 modifies the base frequency of the modulation within an interval of +/−5% of the base frequency of the modulation, preferably within an interval +/−1.5% of the base frequency of the modulation, even more preferably within an interval +/−0.1% of the base frequency of the modulation. As can be seen in FIG. 2, at the points of time marked $t_1$, $t_2$, $t_3$ and $t_4$, the perturbation changes in respect to its phase from 0° to 90°, 180°, and 270°, respectively.

In this exemplary embodiment of the invention, light source 2, modulation unit 3, modulation clock 4, and perturbation clock 5 are individual components of the time-of-flight camera 1, but can also be provided in modified embodiments in functional groups comprising at least two of the above mentioned components.

The time-of-flight camera 1 further comprises a reception group 6 with a receiver unit 7, an evaluation unit 8 and a processing unit 9. The reception group 6 is optionally connected to the perturbation clock 5 to receive the perturbation signal. The reception group 6 is also connected to the output of the modulation unit 3 as a reference signal. Although in this exemplary embodiment of the invention, receiver unit 7, evaluation unit 8 and processing unit 9 are provided together forming the reception group 6, in modified embodiments of the invention they can be provided as individual functional units of smaller functional groups.

The receiver unit 7 can comprise several light receiving locations, which are not explicitly shown in the diagram of FIG. 4, and which are also referred to as pixels. The TOF camera 1 further comprises an optical system, which is not shown in FIG. 4. By means of the optical system, the periodic light signal emitted from the light source 2 are directed towards the scene and reflections of objects of the scene are directed towards the different pixels of the receiver unit 7. Hence, different pixels can receive reflections from different objects independently and at the same time.

The evaluation unit 8 evaluates the time-of-flight of the received reflections individually for each pixel of the receiver unit 7 under consideration of the output of the modulation unit and/or the perturbation signal provided from the perturbation clock 5.

The calculation unit 9 derives distance information from the time-of-flight information provided by the evaluation unit 8 for each pixel or group of pixels and provides this information via an interface, which is not shown in FIG. 4, to a user or a further processing device.

Now, the process for providing distance information of the scene is described in detail.

Figure 3:
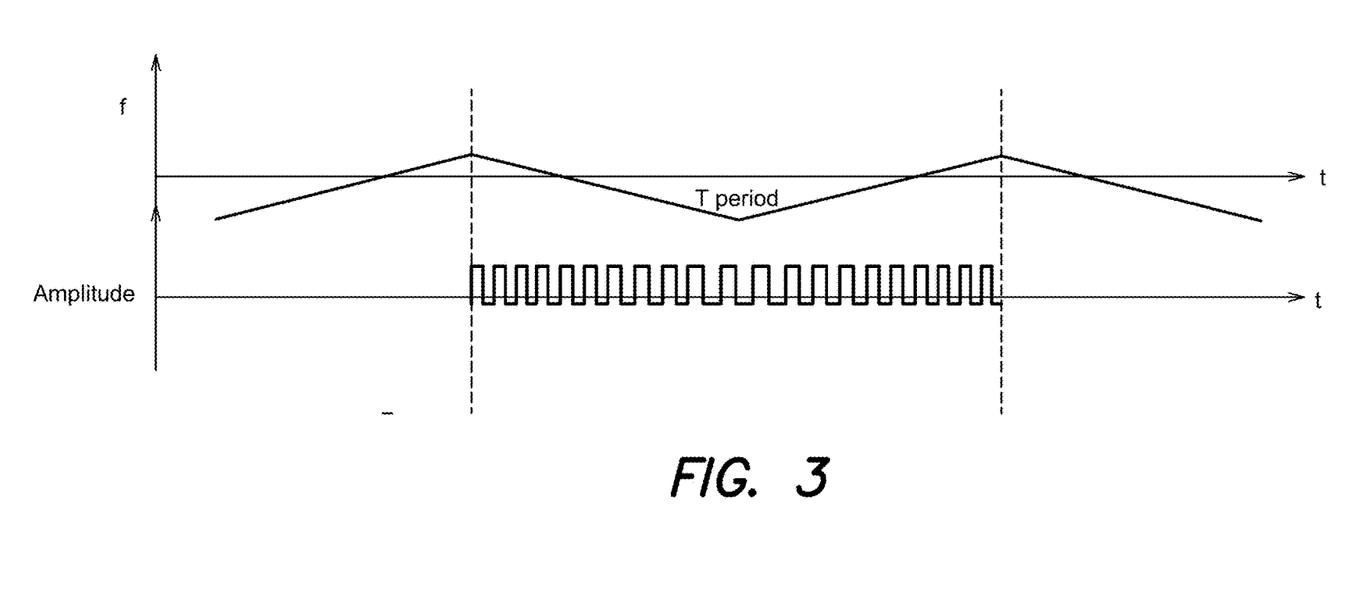
FIG. 3 shows a time diagram of the modulation signal according to an embodiment of the present invention.

The method starts with emitting a periodic light signal such as modulated light pulses from the light source 2 towards the scene. The periodic light signal such as the modulated light pulses is generated using the modulation signal provided by the modulation unit 3. FIG. 3 shows schematically examples of a frequency signal of the perturbation clock 5 (upper graph) and the modulation signal from the modulation unit 3 to the light source 2 (lower graph). The upper part of the diagram of FIG. 3 indicates the change of the frequency of the periodic light signal of the modulation signal from the modulation unit 3 over the time in accordance with the applied perturbation. As can be seen in the lower part of the diagram of FIG. 3, the pulses of the modulation signal are provided to the light source 2 (to form the periodic light signal) with a varying frequency and length accordingly.

Next, reflections of the periodic light signal e.g. the light pulses are received from the scene by the receiver unit 7 via the optical system. The reflections are generated by the objects present in the scene.

The steps of emitting the periodic light signal such as modulated light pulses and receiving the reflections from the scene are repeated and the received reflections are integrated by the evaluation unit 8. As indicated in the lower part of the diagram of FIG. 2, reception of reflections from the modulated light pulses are started at the points of time denoted as $t_1$, $t_2$, $t_3$ and $t_4$. As can be seen in FIG. 2, receiving the reflections of the periodic light signal e.g. modulated light pulses is, in this example, always started at a peak of the perturbation frequency modulating signal, and therefore at the same position of the perturbation frequency modulating signal. The reception is performed in this embodiment of the present invention for a measurement time over an integer number such as six full periods of the perturbation modulation signal and the first of these is marked as "measure". Accordingly, the step of receiving reflections of the periodic light signal, e.g. modulated light pulses from the scene is spanned for each performance over the same number of full perturbation periods and, as can be seen in FIG. 2, a length of the perturbation period is shorter than the measurement time of each reception of the light pulse. Further, this operation provides that in all performances of emitting a periodic light signal such as modulated light pulses towards the scene, the average frequency of the modulation signal provided to the light source 2 is essentially identical.

In this exemplary embodiment of the present invention, four integration intervals marked as "measure" are evaluated sequentially. In alternative embodiments, the received reflections can be integrated all at the same time in the receiver unit 7.

The evaluation unit 8 evaluates a time-of-flight information for the received reflections of the periodic light signal such as the modulated light pulses for all pixels under consideration of the perturbation applied to the base frequency of the periodic light signal, and provides the time-of-flight information to the calculation unit 9. The calculation unit 9 derives distance information for all pixels or groups of pixels from the provided time-of-flight information and provides this information as distance information of the scene for further processing. The distance information of the scene is therefore provided as an average over the four integration intervals. A time, marked as "readout" is used by the reception group 6 for processing the received reflections.

A resulting spectrum of an EMC measurement for the time-of-flight camera 1 according to this embodiment of the invention has peak energies provided more uniformly over at least a part of the frequency range.

Figure 6:
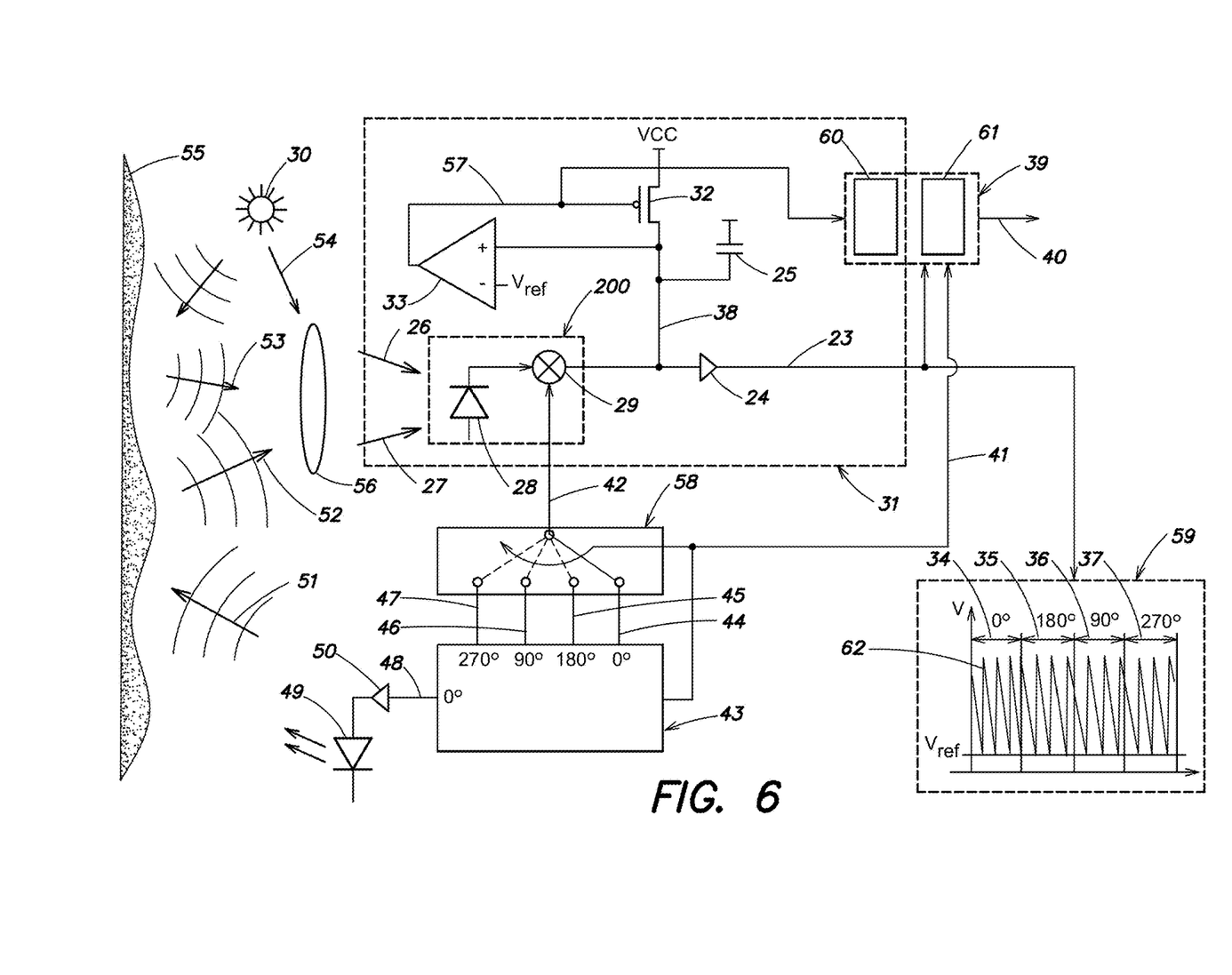
FIG. 6 schematically shows an implementation of a TOF camera according to an embodiment of the present invention.

FIG. 6 shows another embodiment of a TOF camera or range finding system according to the present invention. The range finding system comprises a light source 49 for emitting periodic light 51 onto a scene 55, preferably focussed onto an area of interest, where the light is reflected. The range finding system further comprises at least one pixel 31 for receiving reflected light. In order for the light source 49 to emit modulated light, a signal generator 43 is provided. The signal generator 43 generates a first Spread Spectrum perturbed clock signal or modulation signal on node 48 that is preferably permanently oscillating at a predetermined average frequency, e.g. at about 10 MHz. This signal generator 43 also generates similar second to fifth Spread Spectrum perturbed clock signals (e.g. derived from a single Spread Spectrum clock generator 43) which are delivered onto nodes 44, 45, 46, 47, respectively, having a 0°, 180°, 90° and 270° phase relation with the first clock signal on node 48 with respect to the perturbation period. A person skilled in the art can also consider using other or more clock phases in the operation scheme, more clock phases leading towards better measurement precision in exchange for a longer measurement time. The perturbation frequency is within an interval of +/−5% of the base frequency, preferably within an interval +/−5% or +/−1.5% of the base frequency, or within an interval +/−0.1% of the base frequency of the modulation. The periodic perturbation can have a sinusoidal or triangular waveform, for example.

The signal generator 43 can also generate a control signal 41 that is determining for a modulation signal alteration means to change the modulation signal, e.g. a control signal 41 that is determining for a selector 58 to select between the second to fifth Spread Spectrum perturbed clock signals, i.e. between the different phases of the clock signal. Selector 58 is switching sequentially between these four phases connecting the input node 42 of a mixer 29 of a detector and mixer stage 200 with the second to fifth clock signals on nodes 44, 45, 46 and 47 sequentially. At each of these positions selector 58 can stay connected for a relaxation period of e.g. about 1 ms.

A further control signal can be generated to determine the position in the pulse sequence where the start and stop of measurements occurs. Alternatively, the system makes sure that for each integration time the exact same number of periods of the perturbation signal is used. Measurements can be started at the same moment (phase) of the perturbation signal, as the spectral content is not affected as long as the measurement is over an integer number of half periods.

Buffer 50 drives the light source 49 that emits its light 51 onto the scene 55, preferably focused on the area of interest. Part of this light will be reflected, thus generating reflected light 52. This reflected light 52 then arrives on an optical focussing system such as a lens 56, through which it is imaged or focussed on a detector 28 inside pixel 31, where the incident fraction is called the reflected modulated light (ML) 27.

Indirect light 53 and direct light 54, both originating from secondary light sources 30 not intended for the TOF measurement, will also be present in the scene, impinge on the optical focussing system 56 and thus be focused on the detector 28. The part of this light entering detector 28 will be called background light (BL) 26. Light sources 30 generating BL include incandescent lamps, TL-lamps, sunlight, daylight, or whatever other light that is present on the scene and does not emanate from the light source 49 for TOF measurement. An aim of the present invention is to obtain valid TOF measurements even in the presence of the signal from BL 26.

ML 27 and BL 26 impinge onto the photodetector 28, and generate, respectively, an ML-current and a BL-current, which are photo-induced current responses to the impinging BL 26 and ML 27. Detector 28 outputs these currents to a subsequent mixing means, e.g. mixer 29, for mixing the current responses to the impinging BL 26 and ML 27 with the phase-shifted clock signal on input node 42. As already stated earlier, this BL 26 can induce a BL-current of up to 6 orders of magnitude higher than the ML-current induced by the ML 27 received for TOF measurements.

Detector 28 and mixer 29, forming detector and mixer stage 200, can as well be implemented as one single device, for example as described in EP1513202A1, where the photo-generated charges are mixed generating the mixing product current at once.

The detector and mixer stage 200 will generate the mixing products of the current responses to the impinging BL 26 and ML 27 with phase-shifted clock signals, and these signals are being integrated on node 38 by means of an integrator, for example implemented with a capacitor 25, which preferably is kept small, e.g. the parasitic capacitance of the surrounding transistors. During integration, an automatic reset of the mixer output signal on the integrator node 38 is performed.

This may for example be implemented by a comparator 33 triggering a reset switch, e.g. reset transistor 32, so that the mixer output signal on node 38 is automatically reset whenever it reaches a reference value Vref, thus avoiding saturation.

In alternative embodiments, not illustrated in the drawings, the automatic reset of the mixer output signal on the integrator node 38 can be implemented in several other ways. One of them is triggering a charge pump, instead of the reset switch 32, to add a fixed amount of charges to capacitor 25 yielding a better noise performance at the cost of some more complexity.

The mixing products forming the mixer output signal are available in a sequential form synchronised with the modulation signal alteration means, in the example illustrated selector 58, at integrator node 38. An output driver 24, e.g. a buffer, provides a voltage gain substantially of one and current amplification so as to provide a stronger output signal at output node 23.

Various modifications are included within the scope of the invention such as application of a discontinuous perturbation modulation to the light pulses. Further the system may be adapted for dynamically increasing or decreasing the perturbation frequency. Further when the power of the light pulses is lower, the perturbation frequency can be reduced.

The invention claimed is:

1. A time-of-flight based distance measurement system comprising:
    a light source for emitting a periodic light signal towards a scenes;
    timing circuitry configured to:
        provide a modulation signal for the light source, wherein the modulation signal has a clock timing with a base frequency; and
        provide the modulation signal over a measurement duration in accordance with the clock timing that is spread by a periodic perturbation, wherein an average of the base frequency is kept constant;
    a time-of-flight sensor configured to receive reflections of the periodic light signal from the scene; and
    a processor configured to derive distance information from the received reflections at the time-of-flight sensor.

2. The time-of-flight based distance measurement system of claim 1, wherein the measurement duration is an integer or half integer multiple of a period of the periodic perturbation.

3. The time-of-flight based distance measurement system of claim 1, wherein the modulation signal has a same spectral content over the measurement duration as over any other measurement duration.

4. The time-of-flight based distance measurement system of claim 1, wherein deriving distance information comprises integrating the received reflections of the periodic light signal over the measurement duration.

5. The time-of-flight based distance measurement system of claim 1, wherein the periodic perturbation is discontinuous modulation.

6. The time-of-flight based distance measurement system of claim 1, wherein the periodic perturbation is a continuous signal.

7. The time-of-flight based distance measurement system of claim 1, wherein the periodic perturbation is symmetric.

8. The time-of-flight based distance measurement system of claim 1, wherein the timing circuitry is further configured to dynamically change a frequency of the periodic perturbation.

9. The time-of-flight based distance measurement system of claim 1, wherein the timing circuitry is further configured to lower a power of the periodic light signal and reduce a frequency of the periodic perturbation.

10. The time-of-flight based distance measurement system of claim 1, wherein the periodic light signal is a pulsed or sinusoidal signal.

11. The time-of-flight based distance measurement system of claim 1, wherein a frequency of the periodic perturbation is within an interval of the base frequency.

12. A method for measuring distance based on time-of-flight comprising:
    emitting, using a light source, a periodic light signal towards a scene;
    providing, using timing circuitry, a modulation signal for the light source, wherein the modulation signal has a clock timing with a base frequency;
    providing the modulation signal over a measurement duration in accordance with the clock timing that is spread by a periodic perturbation, wherein an average of the base frequency is kept constant;
    receiving, using a time-of-flight sensor, reflections of the periodic light signal from the scene; and
    deriving, using a processor, distance information from the received reflections.

* * * * *